United States Patent [19]
Wakuda

[11] Patent Number: 5,959,952
[45] Date of Patent: Sep. 28, 1999

[54] TRACK-FOLLOW CONTROL DEVICE

[75] Inventor: Hiroshi Wakuda, Fukushima-ken, Japan

[73] Assignee: Alps Electric Co., Ltd., Tokyo, Japan

[21] Appl. No.: 09/007,396

[22] Filed: Jan. 15, 1998

[51] Int. Cl.$^6$ ............................. G11B 7/00; G11B 5/596
[52] U.S. Cl. .................................. 369/44.32; 369/44.35; 360/77.04
[58] Field of Search .................... 369/43, 44.11, 369/44.13, 44.25, 44.26, 44.27, 44.29, 44.31, 44.32, 44.33, 44.34, 44.35, 44.36, 47, 53, 54; 360/77.01, 77.04

[56] References Cited

U.S. PATENT DOCUMENTS

| | | | |
|---|---|---|---|
| 5,121,374 | 6/1992 | Barton et al. | 369/44.32 X |
| 5,539,714 | 7/1996 | Andrews, Jr. et al. | 369/44.32 X |
| 5,742,573 | 4/1998 | Hajjar et al. | 369/44.32 |

*Primary Examiner*—Paul W. Huber
*Attorney, Agent, or Firm*—Brinks Hofer Gilson & Lione

[57] ABSTRACT

A track-follow control device uses a positional error signal representing the positional error between a target track on a recording medium and a head for recording information to or reproducing information from the recording medium. The track-follow control device controls an actuator to follow the target track by means of a signal from a sub-controller for outputting a correction signal by using its gain circuit for performing gain correction in accordance with an output result from a main-controller for outputting a positioning control signal to the actuator and a band-pass filter for allowing the passage of a predetermined frequency of the positional error signal. The sub-controller extracts only an eccentric frequency, which prevents the correction signal from breaking.

2 Claims, 4 Drawing Sheets

TRACK-FOLLOW CONTROL DEVICE

BACKGROUND OF THE INVENTION

1. Field of the Invention

The present invention relates to a track-follow control device used in a disc system using a floppy disc, a hard disc, a digital video disc, a compact disc or an optical disc.

2. Description of the Related Art

A disc such as a floppy disc or hard disc is divided into concentric tracks, and each track is physically or logically divided into sectors or the like. Information is read or written by using an actuator to move a recording/reproducing head to the position of a target track on the divided regions.

A shift in the center of a motor for rotating a disc recording medium, a shift in chucking due to a shift in the center of the recording medium, and deformation of the recording medium due to a temperature increase cause eccentricity.

When the information is read or written, the position of the head is determined by the actuator. At this time, the eccentricity shifts the position of the head from the target track, which thus generates a phase shift as represented by A and an amplitude shift as represented by B. Accordingly, when the position of the head is determined by the actuator, the actuator must be controlled by its control system so that information reading or writing is not affected.

A conventional track-follow control device controls the phase shift and the amplitude shift by means of repeat learning control. In FIG. 3, an example of the conventional track-follow control device using repeat learning control is shown. As shown in FIG. 3, the conventional track-follow control device includes a main-controller 60 for performing velocity compensation, positional compensation and integral compensation, a sub-controller 70 for performing repeat learning control, and an object 80 to be controlled such as an actuator. The sub-controller 70 includes a delay circuit 71 and a band limit filter 72.

Concerning the conventional track-follow control device shown in FIG. 3, the principle of the repeat learning control by the sub-controller 70 will be described below using FIG. 4 in which an example of a repeat-learning-control compensation signal is shown. In FIG. 4, square points represent a positional error signal showing the positional error between the target track and the head, and lozenge points represent a compensation signal caused by the repeat learning.

Referring to a deviation of zero degrees, the sub-controller 70 performs the repeat learning control by adding the present positional deviation to the total of previous positional deviations at zero degrees to form the compensation signal. Specifically, by letting an initial total positional deviation be zero, a positional deviation represented by a1 is added to the initial total positional deviation of zero to form a compensation signal at next zero degrees denoted by b1. Similarly, a positional deviation represented by a2 at zero degrees (b1) is added to the total of previous positional deviations as represented by C1 to form a compensation signal at zero degrees represented by b2. The above-described repeat learning is performed, whereby the compensation signals accumulate until the deviation at zero degrees is an average of zero, and the accumulation is output.

The motion of the actuator as the object 80 to be controlled has physical limitation. Thus, compensation up to high frequencies cannot be performed. Accordingly, the integration result by the repeat learning diverges to infinity so that control up to deviations of zeroes at all frequencies is performed. This divergence is prevented by the band limit filter 72.

According to the conventional track-follow control device, if the band limitation by the band limit filter 72 fails to be set to an optimum range, an appropriate control cannot be performed.

In addition, in digital processing, the integrator of the delay circuit 71 requires compensation-signal data on sampling points for one cycle. Thus, its memory (random access memory) for holding data must have a capacity in accordance with the number of the sampling points.

SUMMARY OF THE INVENTION

Accordingly, it is an object of the present invention to provide a track-follow control device in which only a predetermined eccentric frequency can be easily extracted to enable appropriate band limitation and which enables a reduction in the capacity of a data recording memory.

To this end, the foregoing object has been achieved through provision of a track-follow control device including: a head for recording information to or reproducing information from a recording medium; an actuator for driving the head so as to follow a target track on the recording medium; positional-error generating means for generating a positional error signal representing the positional error between the target track on the recording medium and the head; main-control means for outputting a positioning control signal to the actuator by processing the positional error signal generated by the positional-error generating means; and sub-control means for outputting a correction signal used in the positioning of the actuator by processing the positional error signal generated by the positional-error generating means, the sub-control means comprising a band-pass filter for allowing the passage of a predetermined frequency of the positional error signal generated by the positional-error generating means, and amplification means whose gain is corrected by the output result of the band-pass filter.

Preferably, the band-pass filter includes: Fourier transform means for calculating a predetermined Fourier coefficient in accordance with the positional error signal generated by the positional-error generating means; and inverse Fourier transform means for performing inverse Fourier transformation by accumulatively adding the Fourier coefficient calculated by the Fourier transform means to a previously calculated Fourier coefficient.

Advantages of the track-follow control device of the present invention are as follows:

By compensating only an eccentric frequency with a band-pass filter for extracting only the eccentric frequency, noise in track shifting information can be eliminated, which prevents the control system to diverge due to dimensional variation of mechanical components and which improves positioning precision.

The conventional track-follow control device using repeat leaning requires a memory for holding all sampling points of a particular cycle. However, in the present invention, by using Fourier transformation to constitute the band-pass filter for extracting only the eccentric frequency, only a memory for holding a Fourier coefficient is used, which remarkably reduces the memory capacity, compared with the conventional repeat learning control.

DESCRIPTION OF THE PREFERRED EMBODIMENT

A track-follow control device according to an embodiment of the present invention will be described below with reference to the attached drawings.

Figure 1:
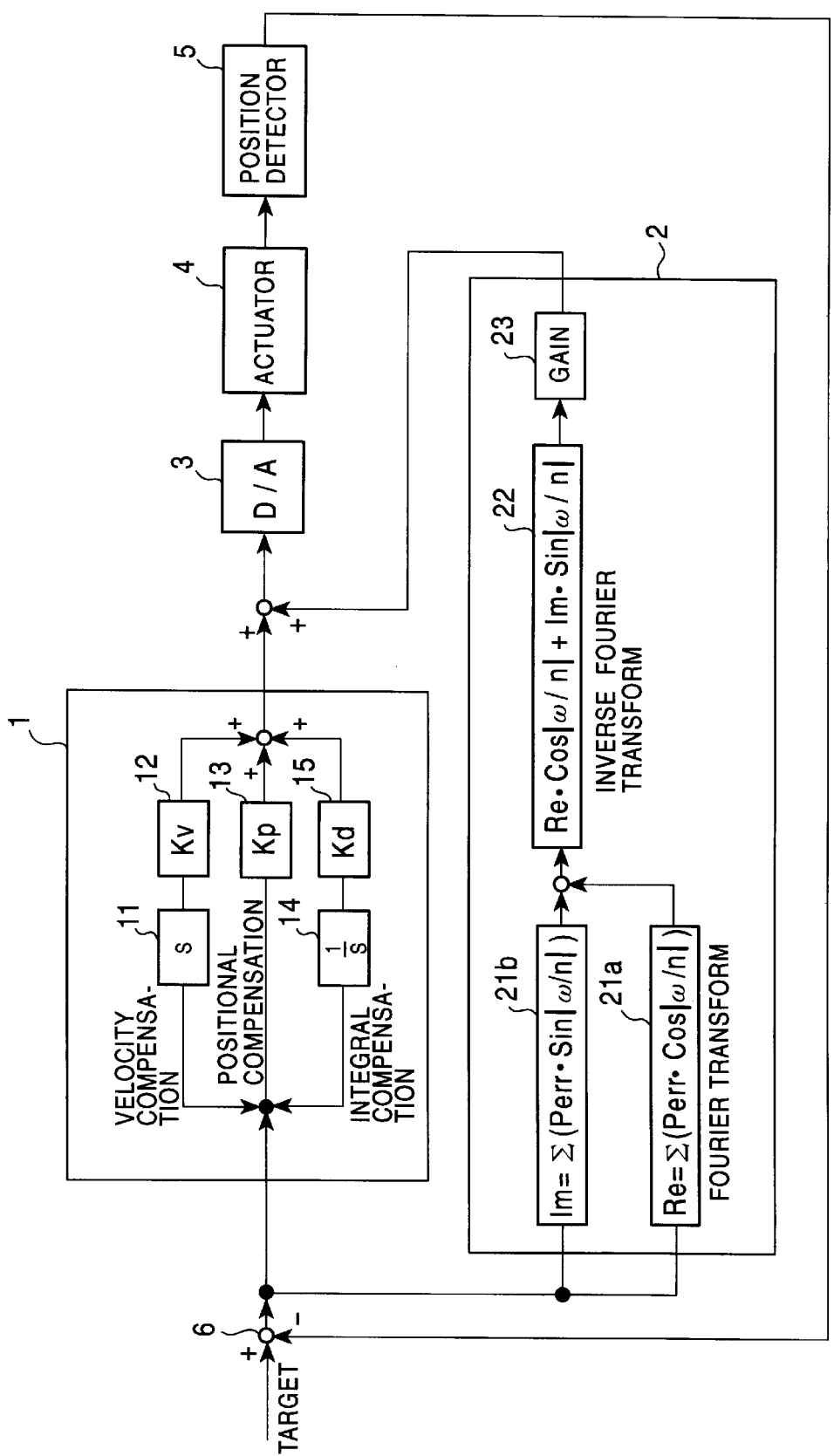
FIG. 1 is a block diagram showing a track-follow control device according to an embodiment of the present invention.
Figure 2:
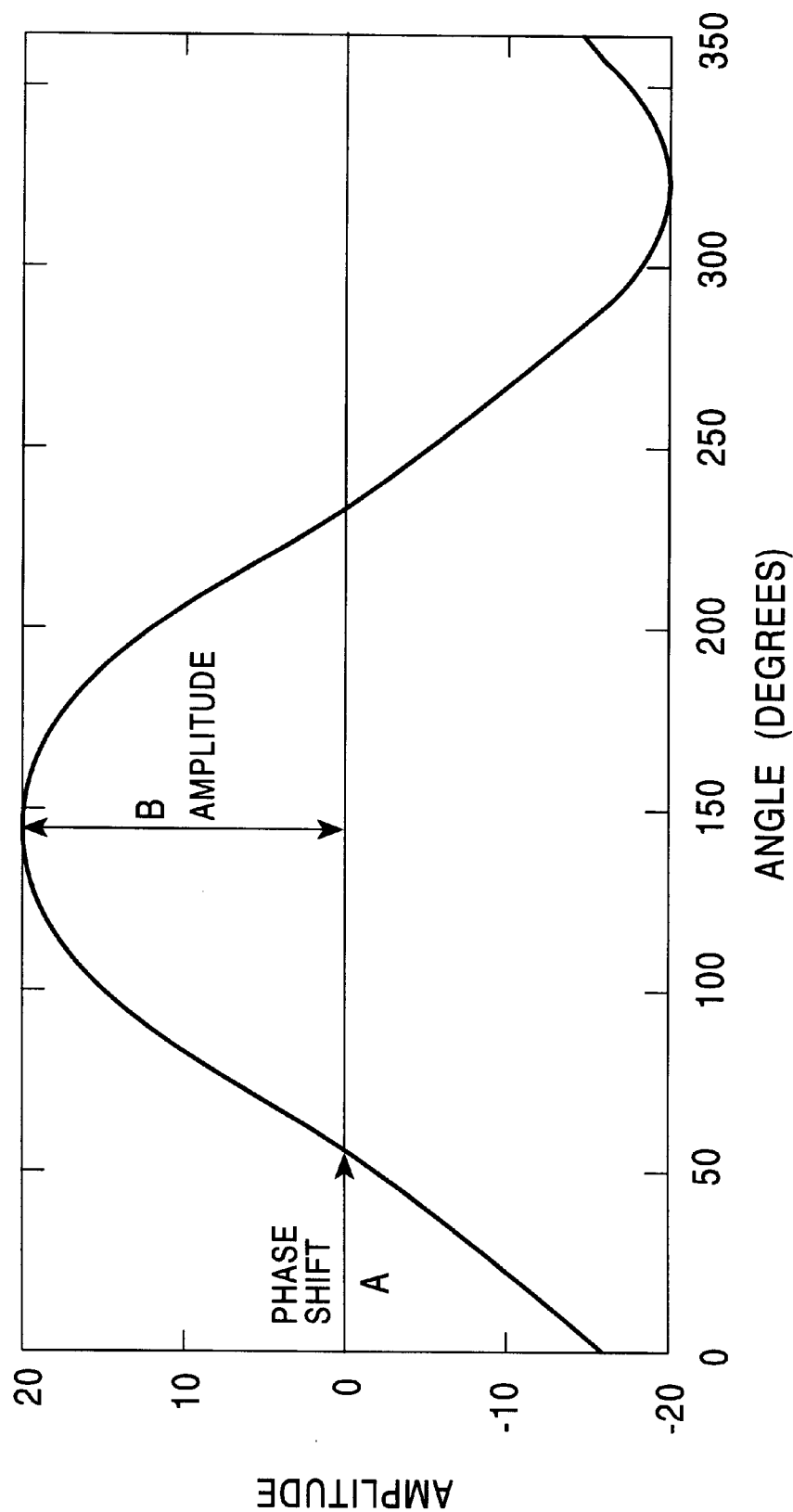
FIG. 2 is a graph illustrating a servo-data read level when the track-follow control device shown in FIG. 1 has eccentricity.
Figure 3:
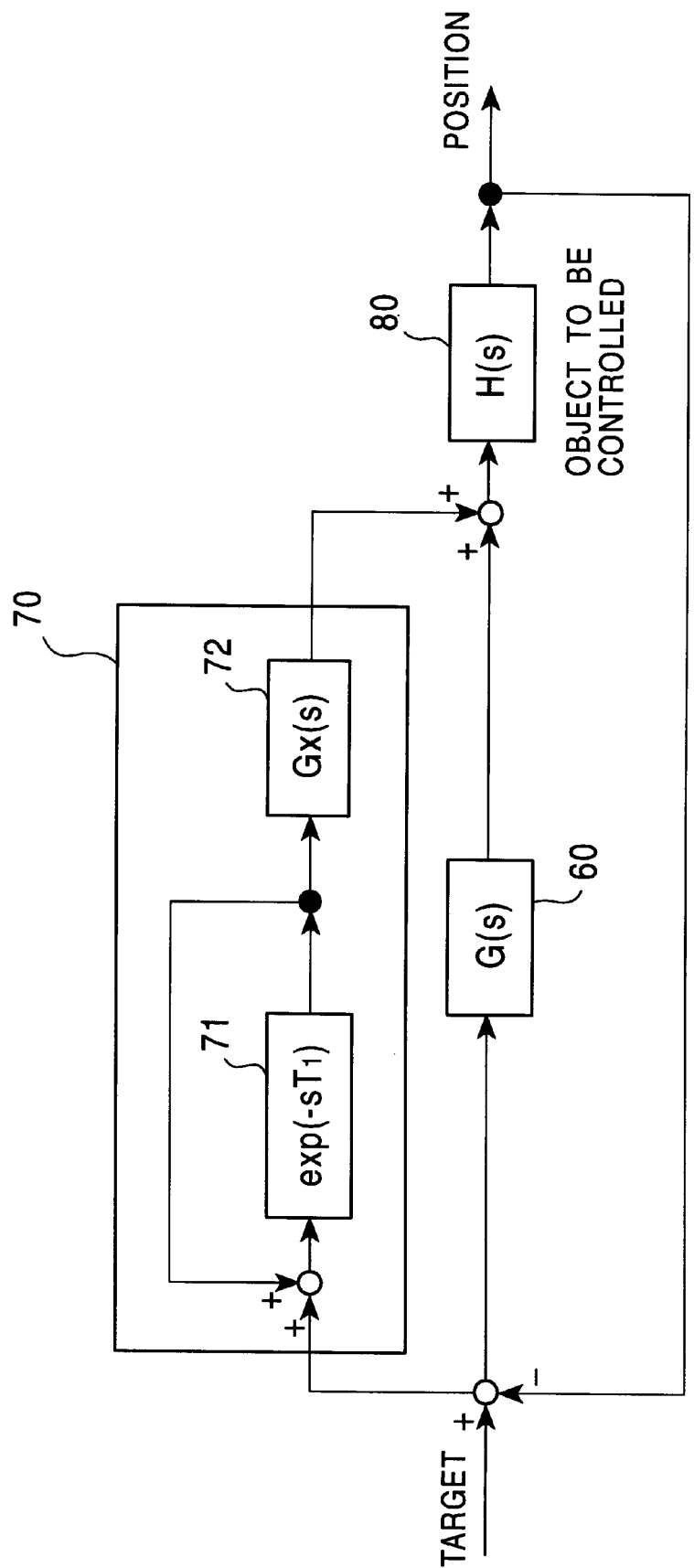
FIG. 3 is a block diagram showing a conventional track-follow control device.
Figure 4:
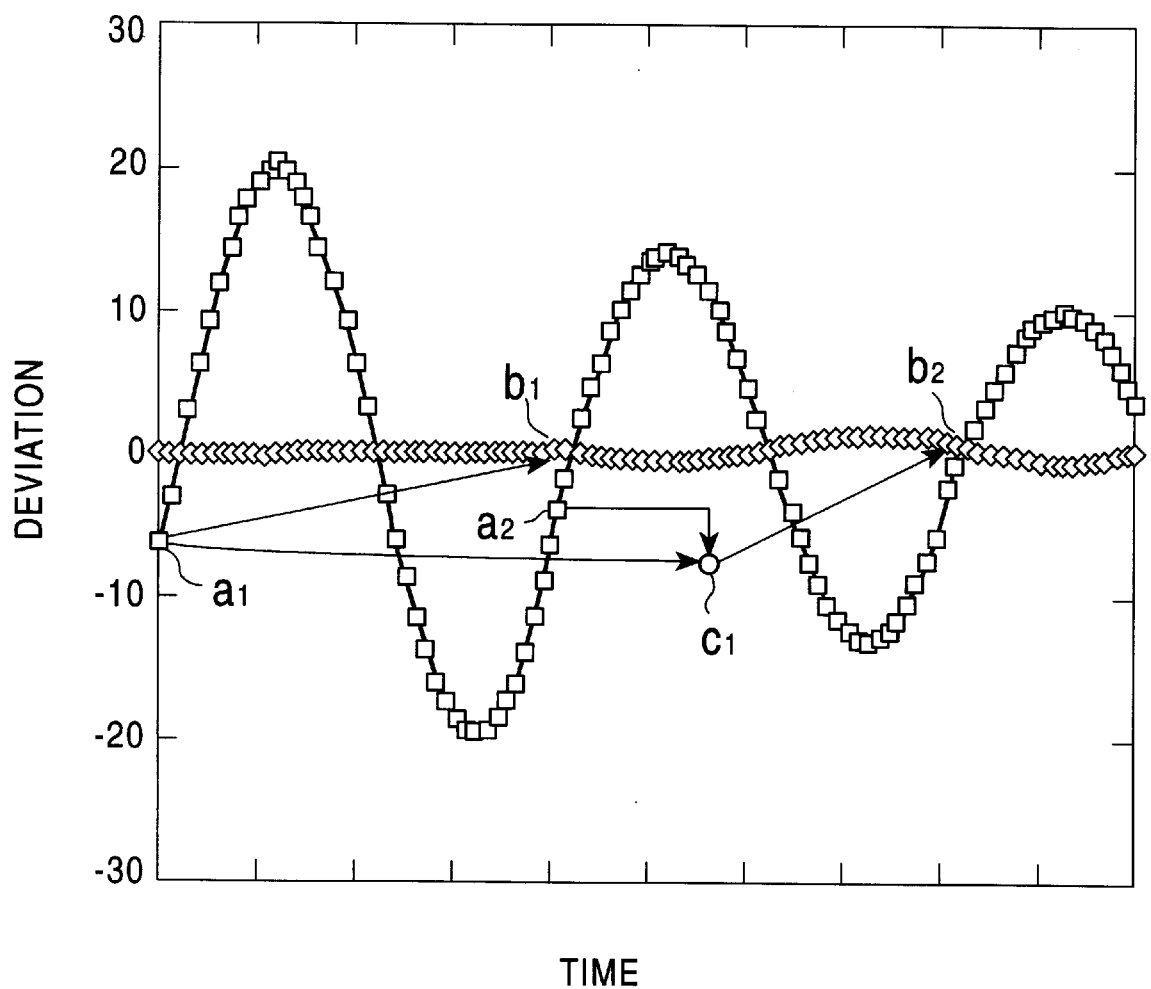
FIG. 4 is a graph showing an example of a control compensation signal generated by repeat learning.

The track-follow control device according to the embodiment is shown in FIG. 1. The track-follow control device includes a main-controller 1 for performing velocity compensation, positional compensation and integral compensation, a sub-controller 2 for compensating eccentricity, a digital-to-analog (D/A) converter 3, an actuator 4 to be controlled, a positional detector 5 for detecting the position of a head, and an adder 6 for calculating an error between a target track and the head position detected by the position detector 5.

The main-controller 1 includes an integral circuit 11, a differential gain (Kv) unit 12, a proportional gain (Kp) unit 13, an integral circuit 14, and an integral gain (Kd) unit 15.

The sub-controller 2 includes a real-part Fourier transformer 21a, an imaginary-part Fourier transformer 21b, an inverse Fourier transformer 22 and a gain circuit 23.

The track-follow control device according to the embodiment operates as follows:

A positional error signal representing the positional error between the target track and the head position detected by the position detector 5 is calculated by the adder 6.

The positional error signal calculated by the adder 6 is input to the main controller 1 and the sub-controller 2. The main-controller 1 samples the positional error signal, and performing the velocity compensation, the positional compensation and the integral compensation of the sampled signal before outputting a positioning control signal to the actuator 4. The main-controller 1 is generally called a PID controller. Specifically, the velocity compensation is performed such that the positional error signal is differentiated by the differential circuit 11, and is multiplied by a predetermined gain with the differential gain (Kv) unit 12. The positional compensation is performed such that the positional error signal is multiplied by a predetermined gain with the proportional gain (Kp) unit 13. The integral compensation is performed such that the positional error signal is multiplied by a predetermined gain with the integral gain (Kd) unit 15. The velocity-compensated signal, the positional-compensated signal and the integral-compensated signal are added to form a digital positioning control signal, which is output to the actuator 4.

The sub-controller 2 extracts a predetermined frequency from the positional error signal, and outputs a digital signal for correcting a phase shift in servo-data caused by eccentricity and an amplitude shift so that reading or writing by the head is not affected. The detailed operation will be described below.

The control signals output from the main-controller 1 and the sub-controller 2 are added to form a digital signal. The digital signal is converted into an analog signal by the D/A converter 3. The converted signal is input as a positioning signal to the actuator 4. The input signal causes the head to move to the target track. Finally, the position of the head is detected by the position detector 5, and the signal output from the position detector 5 is fed back to the adder 6.

The sub-controller 2 operates as follows:

The discrete Fourier transformation of the positional error signal as a digital signal calculated by the adder 6 is performed by the real-part Fourier transformer 21a and the imaginary-part Fourier transformer 21b. The discrete Fourier transformation is performed every certain interval cycle, e.g., every motor-rotation cycle. The Fourier transform of the real part is calculated by $$Re = \Sigma(Perr \cdot \cos |\omega/n|),$$

and
the Fourier transform of the imaginary part is calculated by $$Im = \Sigma(Perr \cdot \sin |\omega/n|)$$

where Re represents a certain-order Fourier coefficient in the real part; Im represents a certain-order Fourier coefficient in the imaginary part; $\omega$ represents a linear eccentric frequency and a quadratic eccentric frequency; and n represents a sampling time (for example, a rotation time for one sector). The linear eccentric frequency is generated by a medium chucking shift and so forth. Thus, the linear eccentric frequency is generated at multiples of the rotational frequency of the motor. However, on the premise that resonance caused by the motor itself exists in the high frequency range, a main frequency component is generated in low order, and decreases as the order increases. Hence, in general, the linear eccentric frequency is the rotational frequency of the motor, and can be found by calculating the linear Fourier coefficient.

The quadratic eccentric frequency is generated by imbalance in the medium caused by the thermal expansion of the medium. In general, deformation in the medium due to the thermal expansion is generated in only a regular direction. Thus, the quadratic eccentric frequency is generated at the double of the motor rotational frequency. Accordingly, the quadratic eccentric frequency can be found by calculating the quadratic Fourier coefficient.

Here, by using the n-th order Fourier coefficients, the amplitude ($|F(n)|$) and phase ($\angle F(n)$) of a frequency factor, n times the fundamental frequency, can be expressed as $$|F(n)| = \sqrt{Re(n)^2 - Im(n)^2}$$

$$\angle F(n) = \tan^{-1}(Im(n)/Re(n))$$

where Re(n) represents the n-th order Fourier coefficient of the real part; and Im(n) represents the n-th order Fourier coefficient of the imaginary part.

As described above, the real-part Fourier transformer 21a and the imaginary-part Fourier transformer 21b calculate the linear and quadratic Fourier coefficients every interval cycle, whereby a particular frequency is extracted. Here, a total of four coefficients, namely, the linear Fourier coefficients of the real and imaginary parts, and the quadratic Fourier coefficients of the real and imaginary parts are found. However, depending on the device type, Fourier coefficients having order more than the second order may need to be found.

The obtained Fourier coefficients are accumulatively added (integrated) to the previously calculated coefficients. This accumulative addition generates a learning effect, which enables the follow-up of an environmental change such as an eccentric change with a temperature increase.

Next, the inverse Fourier transformation of the above-obtained coefficients is performed. The inverse Fourier transform is found by the following numerical expression:

$$Re.\cos |\omega/n| + Im.\sin |\omega/n|$$

Since the Fourier transformers 21a and 21b, and the inverse Fourier transformer 22 allow only a particular frequency component to pass through them, they function as a band-pass filter when it is taken in a broad sense.

The result output from the inverse Fourier transformer 22 is multiplied by a predetermined gain with the gain circuit 23. In accordance with the small gain theorem, when open-loop characteristics in all bands are at zero decibels or less, stability is established regardless of the phase. Accordingly, the compensation gain by the gain circuit 23 is set at not more than one time the gain from the actuator 4 up to the position detector 5.

The Fourier transformation by the sub-controller 2 is discrete Fourier transformation. Thus, the results of the sine and cosine calculations can be predeterminedly stored as a table in a read only memory, which reduces the number of operations. Accordingly, by having the results as a table in the read only memory, for example, 8-bit microcomputers are used to form the Fourier transformer 21a and 21b, and the inverse Fourier transformer 22. Only the result of the sine calculation may be stored as a table in the read only memory, and the sine-table result in 90-degree phase fast may be used as the cosine value. In addition, the Fourier transformers 21a and 21b and the inverse Fourier transformer 22 may be realized by not using microcomputers but semicustom integrated circuits.

Also, in the sub-controller 2, the Fourier coefficients obtained by the Fourier transformers 21a and 21b are used to perform the inverse Fourier transformation with the inverse Fourier transformer 22. Accordingly, on the assumption that the linear and quadratic Fourier coefficients are found by the Fourier transformers 21a and 21b, the inverse Fourier transformation can be performed with only a memory for holding a total of four coefficients, namely, two linear values and two quadratic values. Therefore, using the Fourier transforms can remarkably reduce the memory capacity.

As described above, the sub-controller 2 extracts only the linear and quadratic eccentric frequencies so that reading or writing by the head is not affected, and outputs a control signal for correcting the servo-data phase shift and the amplitude shift caused by eccentricity.

The foregoing embodiment has described the main-controller 1 and the sub-controller 2 when they consist of digital circuits. Instead, analog circuits may be used. In this case, the D/A converter 3 may be omitted.

What is claimed is:

1. A track-follow control device comprising:

a head for recording information to or reproducing information from a recording medium;

an actuator for driving the head so as to follow a target track on said recording medium;

positional-error generating means for generating a positional error signal representing the positional error between the target track on said recording medium and the head;

main-control means for outputting a positioning control signal to said actuator by processing the positional error signal generated by said positional-error generating means; and sub-control means for outputting a correction signal used in the positioning of said actuator by processing the positional error signal generated by said positional-error generating means, said sub-control means comprising a band-pass filter for allowing the passage of a predetermined frequency of the positional error signal generated by said positional-error generating means, and amplification means whose gain is corrected by the output result of said band-pass filter.

2. A track-follow control device according to claim 1, wherein said band-pass filter comprises: Fourier transform means for calculating a predetermined Fourier coefficient in accordance with the positional error signal generated by said positional-error generating means; and inverse Fourier transform means for performing inverse Fourier transformation by accumulatively adding the Fourier coefficient calculated by said Fourier transform means to a previously calculated Fourier coefficient.

* * * * *

UNITED STATES PATENT AND TRADEMARK OFFICE
CERTIFICATE OF CORRECTION

PATENT NO. : 5,959,952
DATED : September 28, 1999
INVENTOR(S) : Hiroshi Wakuda

It is certified that error appears in the above-identified patent and that said Letters Patent is hereby corrected as shown below:

On the Title Page

In column 1, after item [22], please insert the following:

--Foreign Application Priority Data

Jan. 17, 1997   [JP]     Japan     9-006991--

In column 2, after line 1, please insert the following:

--FOREIGN PATENT DOCUMENTS 4-38778              2/7/1992            Japan--

Signed and Sealed this

Twenty-first Day of March, 2000

Attest:

Attesting Officer

Q. TODD DICKINSON

Commissioner of Patents and Trademarks